United States Patent [19]
Nash

[11] 3,861,707
[45] Jan. 21, 1975

[54] DEFLECTION-SENSITIVE ARRANGEMENTS

[76] Inventor: Alan Richard Brine Nash, 39, Abbott's Ride, Farnham, Surrey, England

[22] Filed: Feb. 15, 1973

[21] Appl. No.: 332,615

[30] Foreign Application Priority Data
Feb. 18, 1972 Great Britain...................... 7618/72

[52] U.S. Cl............ 280/124 F, 280/6 H, 267/65 D
[51] Int. Cl............................................ B60g 17/00
[58] Field of Search........ 280/124 F, 6 H; 267/65 D

[56] References Cited
UNITED STATES PATENTS

| | | | |
|---|---|---|---|
| 3,026,125 | 3/1962 | Vogel | 280/124 F |
| 3,063,732 | 11/1962 | Harbers | 280/124 F |

*Primary Examiner*—Philip Goodman
*Attorney, Agent, or Firm*—Nichol M. Sandoe

[57] ABSTRACT

For use in a vehicle self-levelling system, an arrangement senses deflections between sprung and unsprung parts of the vehicle. It including a leaf spring flexed by said deflections and a damper connected thereto to damp the response to transient deflections. The spring is supported on a mounting for relative pivoting therebetween, the support means being substantially coincident with the pivot axis. The damper is mounted side by side with the leaf spring and its parts are also pivotable relative to each other, their pivot axis coinciding with said pivot axis between the spring and the mounting.

12 Claims, 6 Drawing Figures

DEFLECTION-SENSITIVE ARRANGEMENTS

This invention relates to deflection-sensitive arrangements such as may be required to give an indication of or to respond to the vertical displacement that will occur between an axle or axles of a road vehicle and the body or chassis of the vehicle as the loading of the vehicle changes.

It has previously been proposed that an arrangement responsive to the loadings of the axles of a road vehicle should be provided to actuate means that level the vehicle body relative to a transverse pivot axis so that a heavy load in the rear of the vehicle, for example, will not cause the vehicle to have an excessive nose-up attitude.

A difficulty that must be overcome if such an arrangement is to operate successfully is that transient deflections, such as occur when the vehicle travels over surface irregularities should not be transmitted by the arrangement to influence the control means actuated thereby. It is an object of the present invention to provide an arrangement that can respond fully to changes of static loading but that operates in such a manner as to uninfluenced, or substantially uninfluenced, by rapidly fluctuating changes of vertical displacement that would otherwise create unacceptable disturbances.

According to the invention, there is provided an arrangement for sensing the static deflection of a vehicle axle or road wheel relative to a body or chassis of the vehicle and comprising a mounting and a deflection device that are respectively attached to the parts of the vehicle between which said deflection is to be sensed, the deflection device being pivotable relative to the mounting by said deflection and at least a part of said device being resiliently deformable thereby, the arrangement further including a damper comprising two relatively displaceable members of which one is secured to said mounting and the other to the deflection device so as to modify the time: displacement response of the deflection device to changes of said deflection, there being pivot support means between the deflection device and the mounting substantially coincident with the axis of said pivoting movement of the deflection device relative to the mounting.

The damper members can themselves be pivotable relatively to each other and a compact layout can then be achieved by making the pivot axes of the deflection device and the damper co-incident. The deflection device may conveniently comprise a rigid cross-member extending transversely to interconnect a resilient member of the device through which the deflection is transmitted, and a vane member of the damper, said spring member and vane member projecting side by side from the cross-member. Means may be provided to co-operate with said cross-member limiting or preventing displacements axially of the direction of projection of the spring member.

The resilient member may be in the form of a leaf spring that extends into said mounting or carrier and that is engaged by a flexible sealing member close to the pivot axis of the deflection device to seal an opening in the mounting or carrier from which said element projects. Said inward extension can then be clamped by the cross-member, preferably close to said device pivot axis also, to secure it rigidly relative to the vane member.

By way of example, one embodiment of the invention will be more particularly described with reference to the accompanying drawings, wherein.

Figure 1:
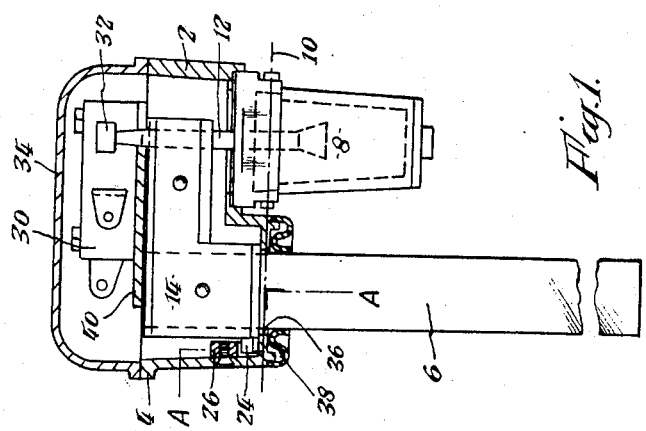
FIG. 1 is a plan view from above of an arrangement according to the invention.
Figure 2:
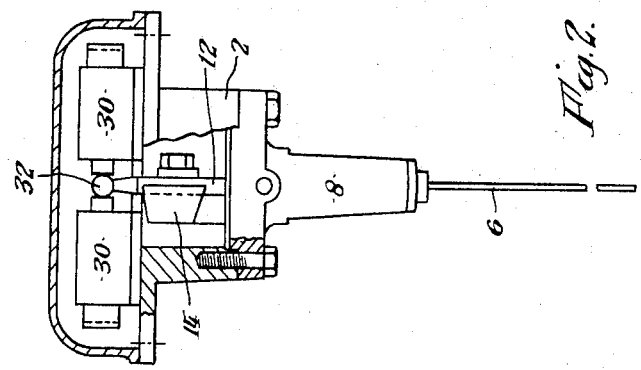
FIGS. 2 to 4 are respectively, side, end and partly sectional underplan views of the arrangement in FIG. 1, the cover being omitted from the end view, FIG. 3.
Figure 4:
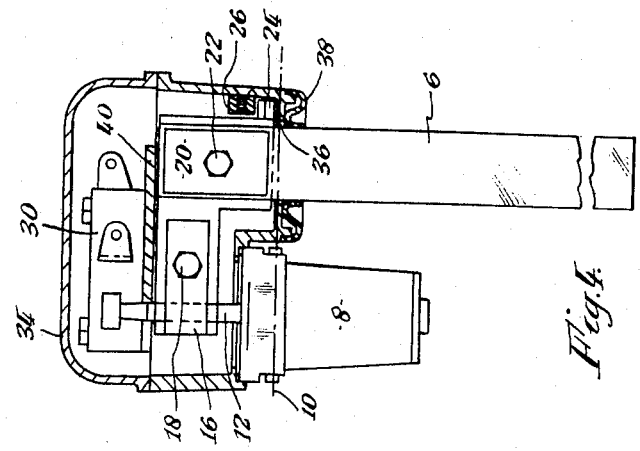

The construction illustrated in FIGS. 1 to 5 of the drawings is intended to sense the deflection of an axle of a road vehicle (as exemplified in the rear axle A of the vehicle in FIG. 6) for the purpose of automatically trimming the vehicle suspension so that the height, and in particular, the attitude, of the vehicle body about a transverse axis is kept close to a predetermined setting despite the deflection of the suspension of the vehicle being otherwise dependent on variations in the vehicle loading.

The arrangement comprises a carrier housing 2 which is attached to a support (not shown) on the body of the vehicle or a part fixed relative thereto, for example a chassis cross-member C (FIG. 6), by flange 4. A leaf spring 6 projecting from the housing 2 is attached at its end remote from the housing to a road axle (not shown) of the vehicle or some other unsprung part of the vehicle suspension: for example, a push-rod P (FIG. 6) may project upwardly from a rear wheel mounting and, by a ball joint on its upper end, be attached to the projecting end of the spring 6, which in such an arrangement extends longitudinally of the vehicle, said end of the spring thereby being displaced vertically and substantially normal to its plane by changes of axle loading.

Secured to the housing 2 is a damper 8, the construction of which is described in more detail in my co-pending application Ser. No. 332,588 filed simultaneously herewith. The damper includes a vane 8a pivoted about axis 10 in a body 8b and having an operating rod 12 secured to it projecting from the damper. The rod 12 is gripped in a semicircular groove in a rigid torsion bar 14 by clamping plate 16 and bolt 18. The leaf spring 6 extends side by side with and parallel to the rod 12 and the torsion bar 14 projects transversely from the rod 12 to the spring 6, which locates in a slot or recess in the bar and is secured to the bar by clamping plate 20 and bolt 22.

Figure 5:
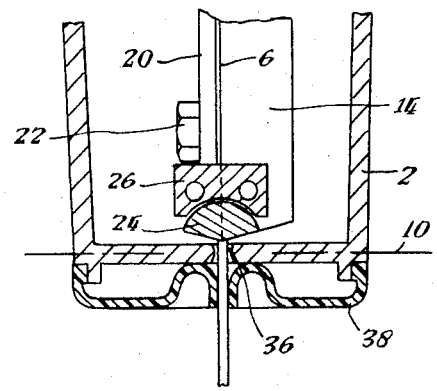
FIG. 5 is a detail section on the line A—A in FIG. 1.
Figure 3:
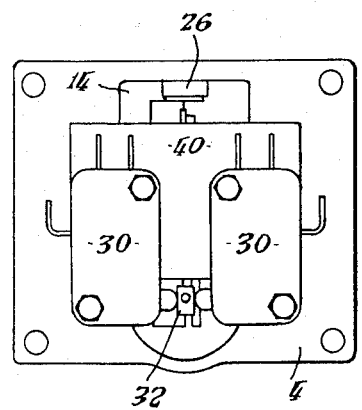
Figure 6:
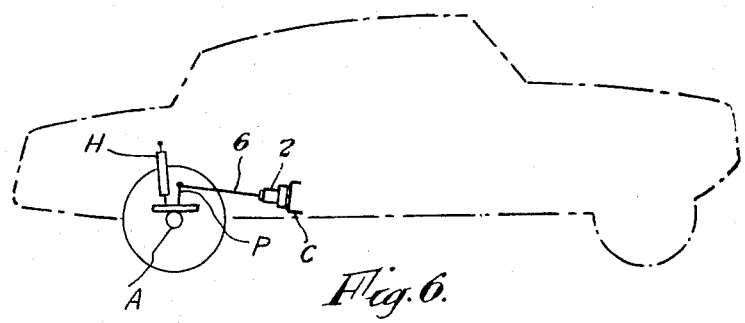
FIG. 6 is a schematic illustration showing the arrangement of the preceding figures mounted on a road vehicle.

The bar 14 should, preferably, operate in pure torsion so that the performance of the damper 8 will not be affected by other disturbing forces. While the nature of engagement of the leaf spring 6 with its associated part of the vehicle will prevent many such forces being developed, it will not prevent the leaf spring being subjected to an axial compression force. To avoid this being transmitted to the damper a segmental stop surface 24 is formed on the torsion bar close to a complementary stop member 26 screwed to the housing. As is best seen in FIG. 5 the arrangement of the elements 24, 26 leaves the torsion bar free to swing about the damper 8 pivot axis 10 but precludes displacement by a compression force acting longitudinally on the spring 6 should such a force occur.

In operation, an increased loading of the axle monitored by the illustrated arrangement will cause the leaf spring 6 to deflect to a new position because of the deflection of the vehicle suspension. The torsion bar and the damper 8 rod which together form a rigid subassembly, will follow this deflection but more slowly because of the fluid resistance offered by the damper 8. The pivoting of the rod 12 then causes one of a pair of microswitches 30, between which head 32 of the rod 12 is engaged, to be operated. This actuates means (not shown) whereby the vehicle suspension is adjusted to compensate for the deflection caused by the added load. Purely for the sake of example, such means may comprise hydraulic cylinders or rams H (FIG. 6) connected between sprung and unsprung parts of the vehicle but since the precise manner in which this self-levelling adjustment is done is not directly relevant to the present invention, no detailed description of this operation is given here. It will be clear however that the adjustment will be arranged to cause a decrease in the deflection of the leaf spring 6, thus tending to restore the rod 12 towards its previous position until the operated microswitch is switched back to leave the vehicle suspension restored substantially to its original position. Lightening of the axle load will give a similar result but, of course, it is the other of the pair of microswitches that is operated.

When the vehicle is in motion, there will be continual changes in the load on the axle through transient responses to the road surface and the vehicle motion. The resistance offered by the damper 8 to such changes, however, will attenuate movement of the rod 12, and the spring 6 then simply oscillates in bending without its movement being followed by the torsion bar 14 sufficiently to operate the microswitches. The spring and damper 8 are so matched, in fact, that the rod 12 will move sufficiently only in response to very low frequency forces applied to the spring and thus effectively the system will only compensate for changes of static loading.

For the continued satisfactory operation of the arrangement described in service, it is desirable that foreign matter shall be excluded as far as possible from the region of the damper and microswitches. For this purpose, a cover 34 is provided for the housing 2, or the vehicle body part against which the housing 2 seats is itself arranged to be sealed from the exterior, and the housing apertures for the damper and leaf spring also have sealing means co-operating with the parts projecting therethrough. In the case of the damper, as will be appreciated from my simultaneously filed co-pending application referred to above, the damper diaphragm provides the seal. For the leaf spring 6, aperture 36 in the housing through which the leaf spring projects is shielded by a rubber sealing boot 38 secured to the housing and that has an inner lip engaging the leaf spring sealingly.

The aperture 36 is substantially coincident with the pivot axis 10 of the damper and the clearance between the longer edges of the aperture and the spring is very small so that the aperture edges provide support for the deflection member against shear forces transverse to the spring and the aperture thus defines a pivot axis for the deflection member. Also, because of the curved shape given to the cross-sectional profile of these edges, the spring will contact them with a rolling or bending, rather than a sliding, movement so that the friction force will be very low. Similar support could be provided alternatively in the illustrated arrangement by an extension of the torsion bar to form a pivot bearing on the housing co-incident with the damper pivot axis.

It will be noted that the sealing boot 38 engages the leaf spring close to the aperture 36. The deflection movement of the leaf spring at this region of engagement will therefore be very small and any resistance offered by the boot to the movement can accordingly be kept to a negligible value.

The microswitches are themselves mounted on a separate plate 40 that is in turn secured to the housing 2 after assembly of the spring/damper arrangement with the torsion bar therein. The plate thus is able to act as an emergency back-stop retaining the torsion bar assembly within the housing against any axial compressive force applied to the spring 6.

What I claim and desire to secure by Letters Patent is:

1. An arrangement for sensing the static deflection of a vehicle axle or road wheel relative to a body or chassis of the vehicle comprising, in combination, first and second members that are respectively attached to the parts of the vehicle between which said deflection is to be sensed, and means interconnecting said members defining a pivot axis about which the members are pivotable relative to each other by said deflection, the first of the members having at least a portion of resilient form that is deformable by said relative pivoting movement, the arrangement further including a damper comprising two elements that are relatively pivotable to exercise a damping function, said pivot of the first and second members providing also the axis of relative pivoting movement of the damper elements, said damper elements being secured one to the first member and the other to the second member whereby to modify the time: displacement response of the relatively pivotable members to changes of said deflection, the first member or at least said resilient portion thereof projecting away from the second member to its attaching vehicle part and the damper extending side-by-side with said first member.

2. An arrangement according to claim 1 comprising a torsionally rigid member connecting the first member to its associated damper element, said rigid member engaging the first member close to said pivot axis of the first and second members.

3. An arrangement according to claim 1 wherein means are provided on the second member to limit or prevent displacement of the first member axially of the direction of projection of the first member from the second member.

4. An arrangement according to claim 1 wherein the first member is in the form of a leaf spring.

5. An arrangement according to claim 1 wherein the second member forms at least a part of an enclosure from which the first member projects.

6. An arrangement according to claim 5 wherein the first member is of elongate flexible form and the second member provides at least a part of an enclosure within which the first member is connected to its associated damper element and from an opening in which the first member projects, a flexible sealing member engaging the first member in the region close to the pivot axis of the first and second members to seal said opening.

7. An arrangement according to claim 5 wherein response means are secured to the enclosure and are operated by said relative displacement of the damper elements, said response means being located beyond the extent of the first member within the enclosure.

8. An arrangement according to claim 7 wherein a member carrying said response means is securable to the enclosure after the securing of the first member and damper to the enclosure.

9. An arrangement for sensing the static deflection of a vehicle axle or road wheel relative to a body or chassis of the vehicle comprising, in combination, first and second members that are respectively attached to the parts of the vehicle between which said deflection is to be sensed, and means interconnecting said members defining a pivot axis about which the members are pivotable relative to each other by said deflection, the first of the members having at least a portion of resilient form that is deformable by said relative pivoting movement, the arrangement further including a damper comprising two elements that are relatively displaceable to exercise a damping function, said damper elements being secured one to the first member and the other to the second member whereby to modify the time: displacement response of the relatively pivotable members to changes of said deflection, the first member or at least said resilient portion thereof being in the form of a leaf spring and the second member forming at least part of an enclosure from which said leaf spring projects to the vehicle part to which the first member is attached, an aperture being provided in said enclosure through which the leaf spring extends to the exterior thereof and a flexible sealing member engaging the leaf spring in a region close to said pivot axis to seal said aperture.

10. An arrangement according to claim 9 wherein said aperture provides pivot support means between the first member and the enclosure to define said pivot axis of the first and second members.

11. An arrangement according to claim 10 wherein opposed edges of the aperture form bearing surfaces for the leaf springs, said edges having a curved profile as seen in a sectional plane perpendicular to said pivot axis of the first and second members such that surfaces of the leaf spring adjacent said edges perform rolling or bending movements upon them substantially without sliding when said relative pivoting occurs between the first and second members.

12. An arrangement according to claim 9 wherein said relative displacement of the damper members is arranged to occur as a pivoting movement about an axis coincident with that of said pivoting movement between the first and second members.

* * * * *